United States Patent
Louis et al.

[19]

[11] Patent Number: 6,119,456
[45] Date of Patent: *Sep. 19, 2000

[54] DISPLACEMENT CONTROL WITH LOAD FEEDBACK AND STROKE CONTROL FOR A HYDRAULIC UNIT

[75] Inventors: Joseph E. Louis, Panora; Gary R. Lingenfelter, Nevada, both of Iowa

[73] Assignee: Sauer Inc., Ames, Iowa

[*] Notice: This patent issued on a continued prosecution application filed under 37 CFR 1.53(d), and is subject to the twenty year patent term provisions of 35 U.S.C. 154(a)(2).

[21] Appl. No.: 09/010,451

[22] Filed: Jan. 21, 1998

[51] Int. Cl.$^7$ .............................. F16D 31/02; F15B 9/10

[52] U.S. Cl. ............................ 60/444; 60/443; 91/376 R

[58] Field of Search .................. 60/443, 444; 91/375 R, 91/506

[56] References Cited

U.S. PATENT DOCUMENTS

| | | | |
|---|---|---|---|
| 3,274,947 | 9/1966 | Jonkers et al. | 91/506 |
| 3,332,323 | 7/1967 | Roeske | 91/375 R |
| 3,650,107 | 3/1972 | Court | 60/443 |
| 3,739,692 | 6/1973 | Bell | 91/506 |
| 3,742,821 | 7/1973 | Martin | 91/506 |
| 4,977,760 | 12/1990 | Ishimori et al. | 60/444 |

FOREIGN PATENT DOCUMENTS 903621  8/1962  United Kingdom .

OTHER PUBLICATIONS

Sauer–Sunstrand, Series 40 Axial Piston Pumps Technical Information, Bulletin BLN–9989 Rev. C, Apr. 1997.
Sauer–Sundstrand, Series 40 M46–Axial Piston Pumps and Motors Service Parts Manual, Bulletin BLN–2–41650 Rev. A, Jul. 1990.
Sauer–Sundstrand, Series 20 Axial Piston Pumps and Motors Technical Information, Bulletin BLN–9565 Rev. O, Feb. 1990.

*Primary Examiner*—F. Daniel Lopez
*Attorney, Agent, or Firm*—Zarley, McKee, Thomte, Voorhees & Sease

[57] ABSTRACT

A displacement control device for a hydraulic unit includes: an actuator for applying operator input force to a movable member for varying displacement of the unit; a control valve having a spool and a sleeve displaceable with respect to each other, one of these being coupled with the movable member and the other being coupled with the actuator, the control valve being capable of generating a control signal based upon the relative displacement of the spool and sleeve; a servo which is operatively connected to the movable member and receives the control signal so as to move the movable member and change the fluid displacement of the unit in response to the control signal; and a bias coupling connecting the spool and the sleeve of the control valve. Thus, a preload force is interposed between and the spool and the sleeve such that relative displacement between the spool and the sleeve takes place when the feedback force exceeds the preload force. Thus, the sleeve moves synchronously with the spool until the feedback force exceeds the preload force. Thereafter, the spool and sleeve move relative to each other so as to generate the control signal to the servo and supplement the operator input force in moving the movable member and thereby varying the fluid displacement of the unit.

30 Claims, 11 Drawing Sheets

DISPLACEMENT CONTROL WITH LOAD FEEDBACK AND STROKE CONTROL FOR A HYDRAULIC UNIT

BACKGROUND OF THE INVENTION

The present invention relates to a control for a hydraulic unit. More particularly, this invention relates to a hybrid displacement control device which provides both direct and servo assisted control of hydraulic units. Such a control mechanism is useful in a variety of hydraulic applications, including but not limited to the propulsion system of a skid steer loader.

Hydraulic units, such as hydrostatic pumps and motors, typically have either a direct manual control mechanism or a servo displacement control mechanism. One advantage of direct manual displacement controls is that they are usually quite simple. They comprise a lever attached directly to the swashplate. The machine operator moves the lever directly or indirectly with cable or linkage means. The operator must supply all of the physical effort or force to stroke the hydrostatic unit. As a result, the operator directly "feels" the load on the hydrostatic system and the position of the control. This load and position feedback is desirable in certain applications, such as vehicle propulsion systems, especially when the operator desires to make precise movements with the vehicle. The load feedback feature, however, requires the operator to supply increased physical force as the load increases. This can result in operator fatigue. However, direct control devices typically have a smaller "dead band" than servo control mechanisms.

A servo displacement control typically utilizes a pressurized hydraulic cylinder to move the swashplate, thereby stroking the hydrostatic unit. Servo control devices provide hydraulic leverage so that a very small degree of physical effort is required to actuate the hydrostatic unit. With this type of control it is even possible to utilize an electro-hydraulic mechanism to stroke the hydrostatic unit with an electrical signal. Additionally, servo controls eliminate the transmission of vibration from the hydrostatic unit through the operator controls. Servo controls reduce the problem of operator fatigue, but load and position feedback and operator "feel" are sacrificed.

Thus, there is a need for a hybrid control which provides servo assisted control at high load conditions and direct manual control at low load conditions to reduce the stroking force required without totally sacrificing operator "feel" under low load conditions.

Therefore, a primary objective of the present invention is the provision of an improved control for hydraulic units.

A further objective of the present invention is the provision of a servo type control which also incorporates a direct displacement control mechanism so as to enable the hydraulic unit to be stroked manually under low load conditions to provide the desired operator "feel".

A further objective of the present invention is the provision of a control which avoids undesirable operator fatigue at high load conditions.

A further objective of the present invention is the provision of a servo type displacement control that provides load and position sensitive feedback to the machine operator.

A further objective of the present invention is the provision of a control which functions as a stroke assist device to lessen the operator effort required to actuate the hydraulic unit at conditions of increased load.

A further objective of the present invention is the provision of a control which simultaneously achieves both of the last two objectives mentioned above.

A further objective of the present invention is the provision of a bias coupling which includes a spring mechanism between the control spool and the control sleeve.

A further objective of the present invention is the provision of a control which is economical to produce, comfortable to use, non-fatiguing and reliable.

These and other objectives will be apparent in view of the drawings, as well as the description and the claims which follow.

SUMMARY OF THE INVENTION

The present invention relates to a displacement control device for hydraulic units. Part of the invention relates to a bias coupling which is operatively interposed between the displacement varying movable member, the actuator and a control valve assembly which has a spool and a sleeve that are displaceable with respect to each other. The bias coupling provides a preload force which must be overcome before the sleeve and spool can move with respect to each other and thereby apply hydraulic assistance for stroking the unit. The control device allows the operator to feel the feedback force and position at low load levels and yet receive hydraulic assistance in stroking the unit at high load levels.

Two embodiments of the present invention are disclosed herein. The first embodiment provides a bias coupling in the form of a compression spring operatively interposed between two levers, one of the levers being connected to the spool and the other of the levers being connected to the sleeve. Thus, the sleeve moves synchronously with the spool until the feedback force exceeds the preload force of the spring.

The second embodiment includes a bias coupling comprising a torsional spring. The torsional spring is operatively interposed between the control sleeve which receives operator input from the actuator and the movable member which receives the feedback and position load. The control spool couples with the movable member so that relative movement between the swashplate and the sleeve results in relative movement between the spool and the sleeve. The relative movement between the spool and the sleeve causes the control valve to port oil to a servo which hydraulically assists the operator in stroking the unit once the preload force of the spring has been exceeded.

Other force generators, such as pressurized cylinders or perhaps even magnetically polarized components, can impart the desired biasing preload force. The invention is adaptable to rotary or linear control valves. The spool and sleeve components can be interchangeably adapted to serve as the drive or feedback receiving members. Any number of conventional servo pistons in a variety of orientations can be controlled to provide the desired hydraulic assistance for stroking the unit.

DETAILED DESCRIPTION OF THE PREFERRED EMBODIMENTS

The present invention will be described as it applies to its preferred embodiments. It is not intended that the present invention be limited to the described embodiments. It is intended that the invention cover all alternatives, modifications, and equivalencies which may be included within the spirit and scope of the invention.

Figure 1:
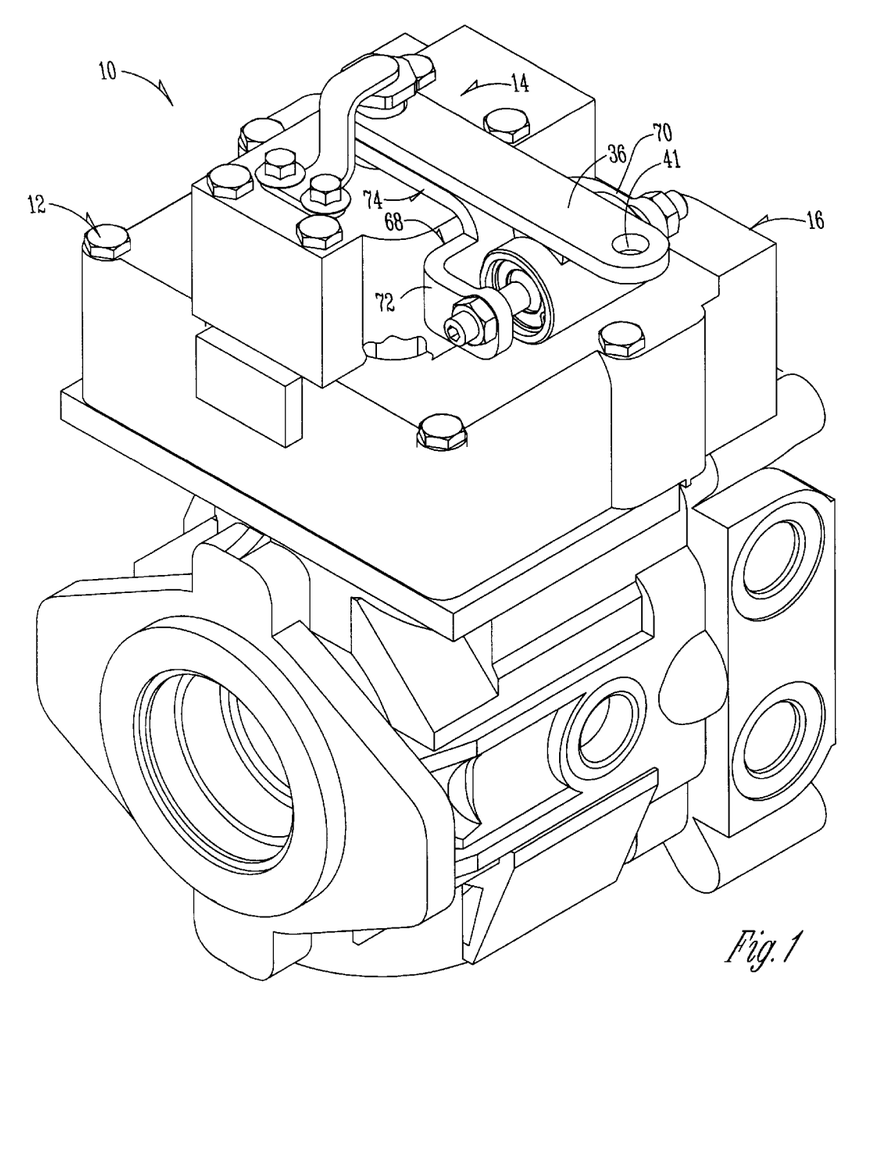
FIG. 1 is a perspective view of a hydraulic unit equipped with the control of the present invention.
Figure 2:
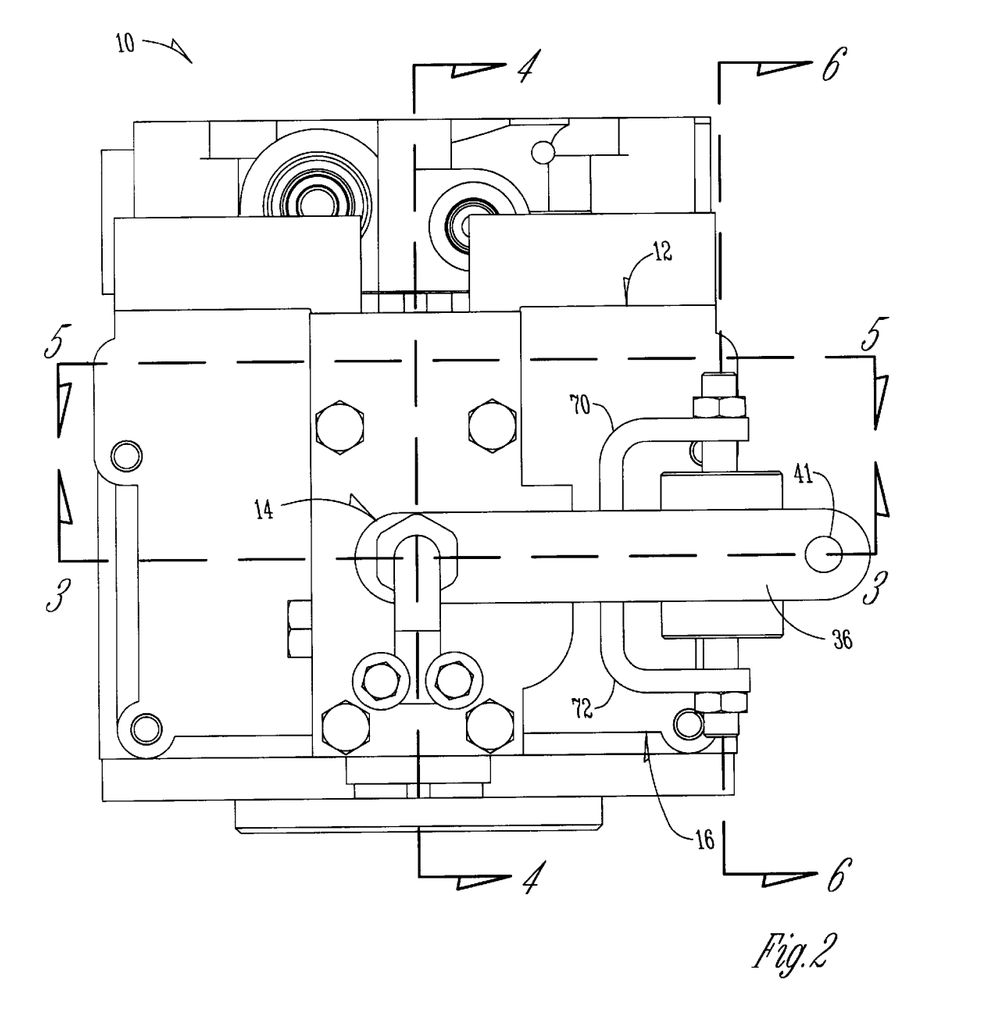
FIG. 2 is a top plan view of the hydraulic unit of FIG. 1.
Figure 3:
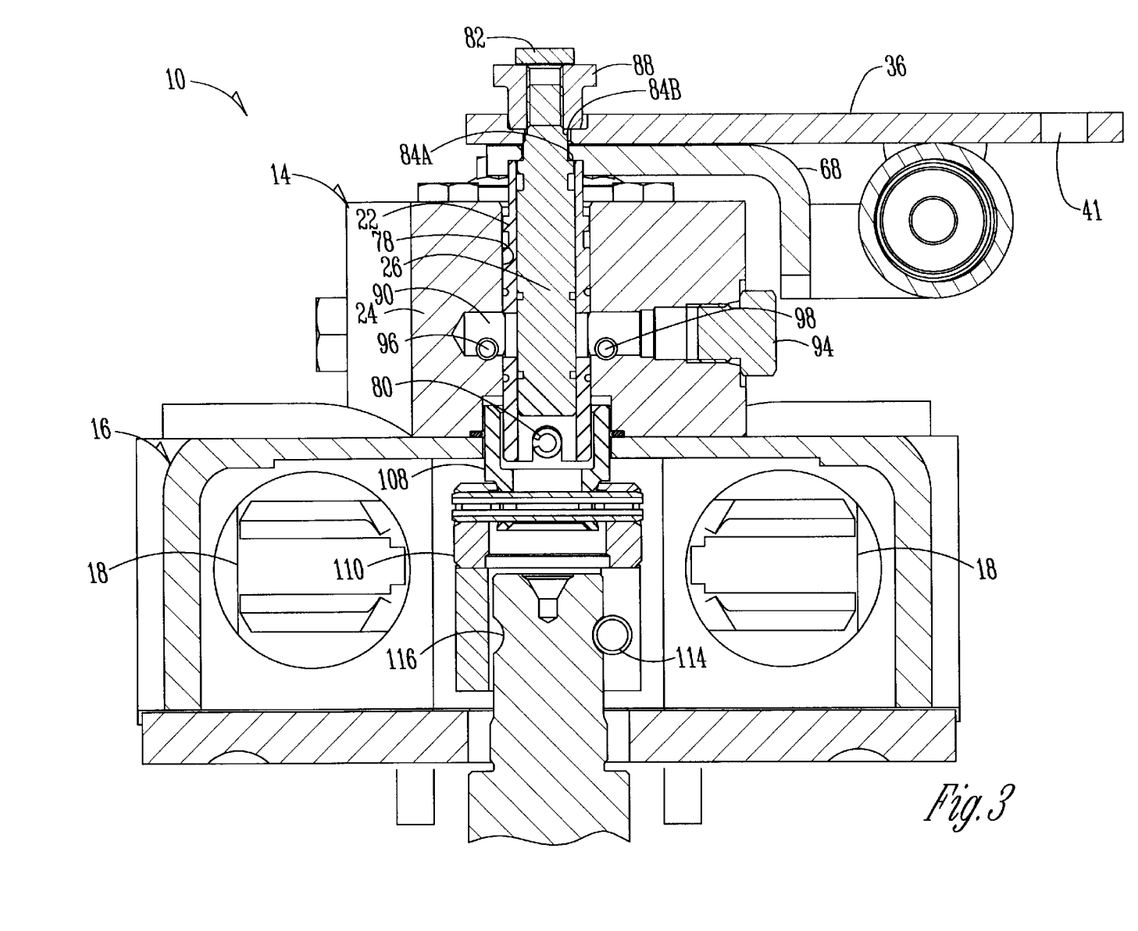
FIG. 3 is sectional view taken along line 3—3 in FIG. 2.
Figure 4:
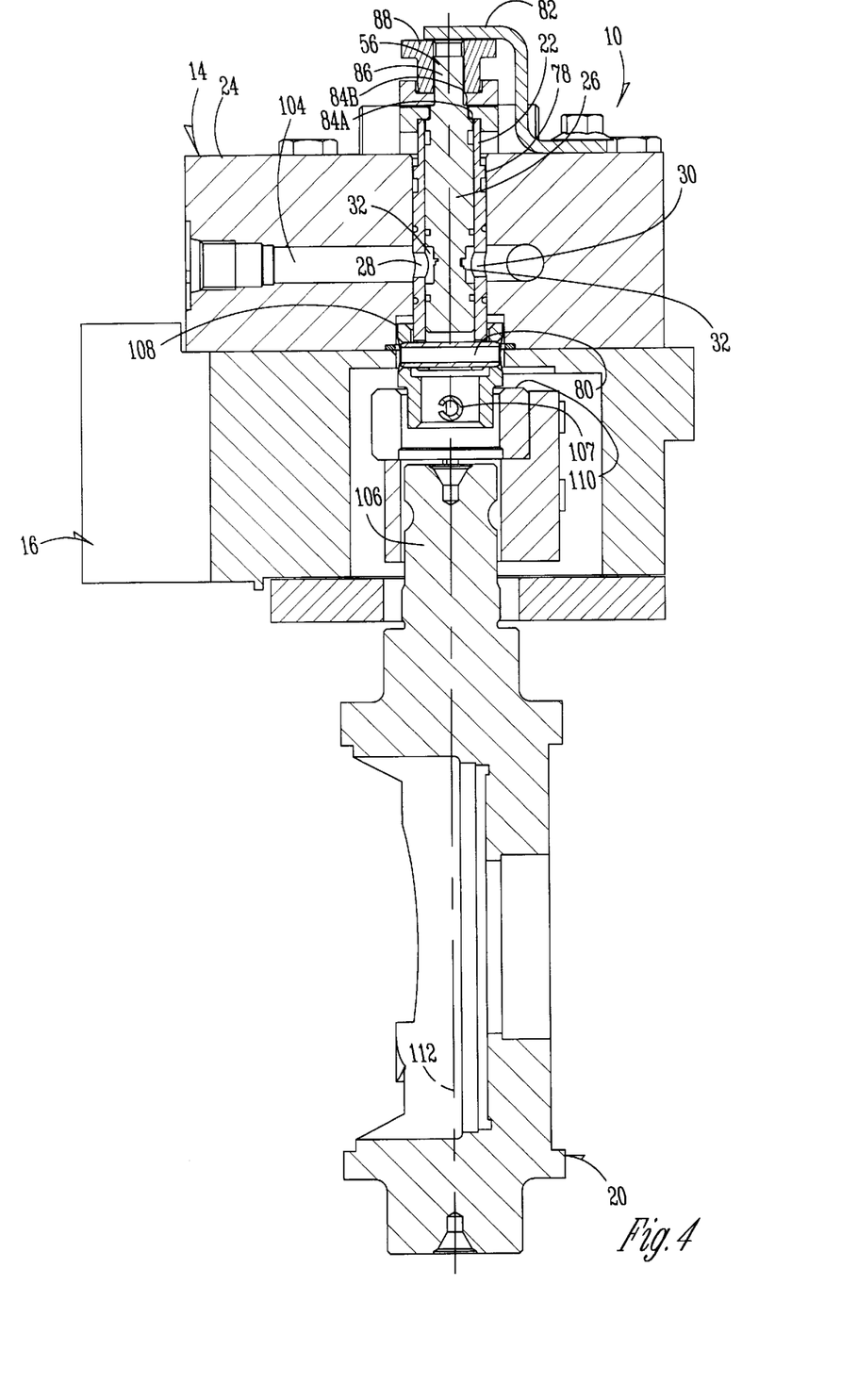
FIG. 4 is a sectional view taken along line 4—4 in FIG. 2.

In FIG. 1, a hydraulic unit 10, for example a variable displacement pump or motor, has the control 12 of this invention associated therewith. The control 12 includes a flow control valve assembly 14 and servo assembly 16. As best seen in FIGS. 3 and 4, the servo assembly 16 includes one or more servo pistons 18 coupled by direct mechanical linkage to a swashplate 20. Therefore, moving the servo piston(s) 18 results in rotation or stroking of the swashplate 20, which changes the displacement of the hydraulic unit 10.

Figure 5:
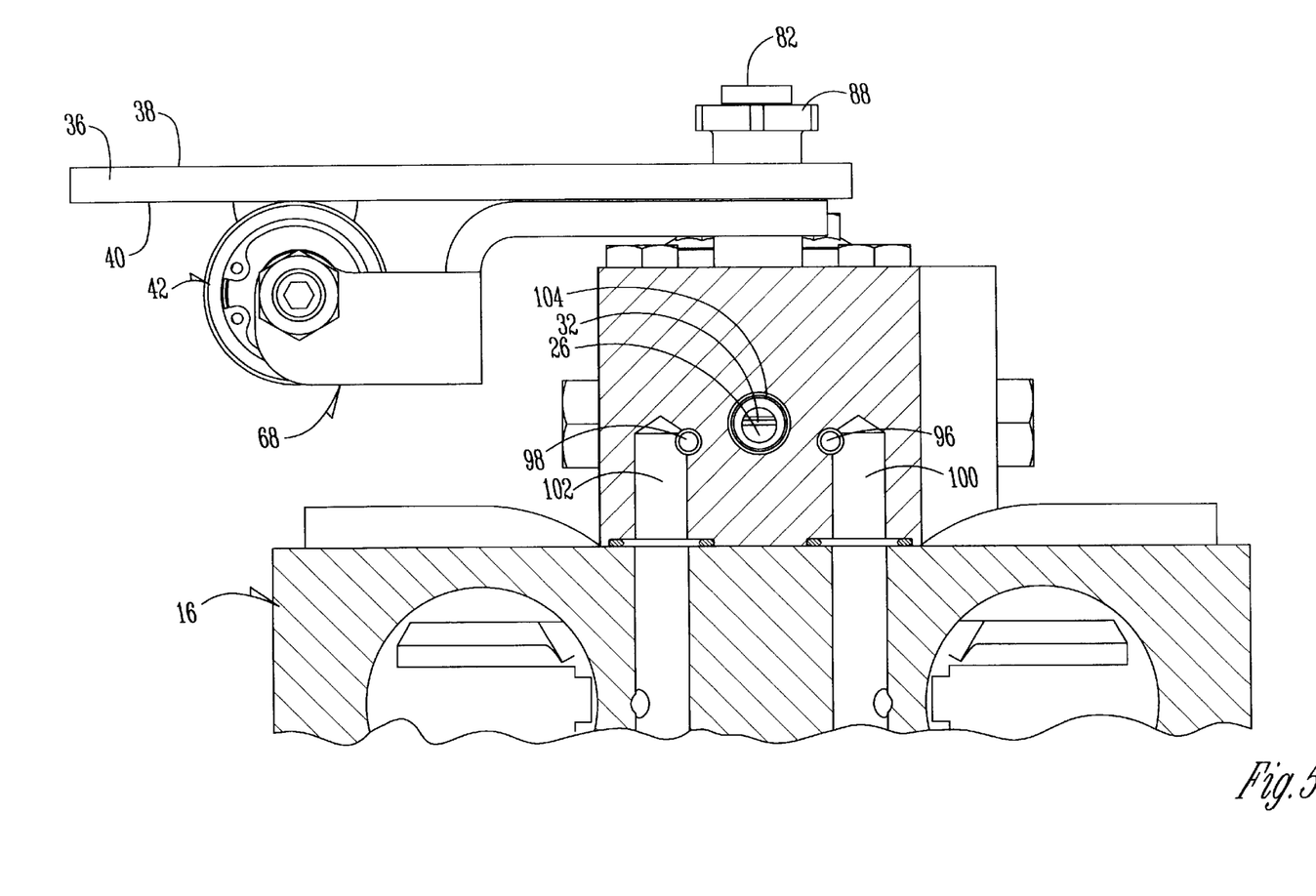
FIG. 5 is a sectional view taken along line 5—5 in FIG. 2.

In FIGS. 3–5, the flow control valve assembly 14 includes a control sleeve 22 rotatably mounted in a control housing 24 which can be remotely mounted and fluidly connected to the servo assembly 16, but is preferably mounted on the servo assembly as shown. A control spool 26 rotatably mounts inside the sleeve 22. The sleeve 22 and the spool 26 are also rotatable with respect to the control housing 24, as will be better understood shortly. The spool 26, sleeve 22, and control housing 24 have appropriate porting passages 28, 30, 32 therein to receive pressurized fluid and subsequently direct this fluid to the servo piston(s) 18 to stroke the swashplate 20, as is conventional and therefore not the subject of this invention. The servo pistons 18 can be conventionally vented to a case drain or a fluid reservoir to permit them to freely function as pressurized fluid is displaced towards them as shown by Sauer Sundstrand Bulletin Number 9989.

Referring to FIGS. 1, 3 and 5, an actuator 36 rigidly mounts on the control spool 26 for rotating the spool 26. The actuator 36 has an essentially prismatic shape, although it is contemplated that other shapes can be utilized without detracting from the invention. The actuator 36 has a top and bottom planar surfaces 38, 40. One end of the actuator 36 drivingly attaches to the spool 26 and conventional mechanical linkage (not shown) can engage the actuator 36 at a hole 41 near the other end. An electric or electro-hydraulic actuating mechanism could be utilized in place of or in conjunction with the mechanical linkage without detracting from the invention.

Figure 6:
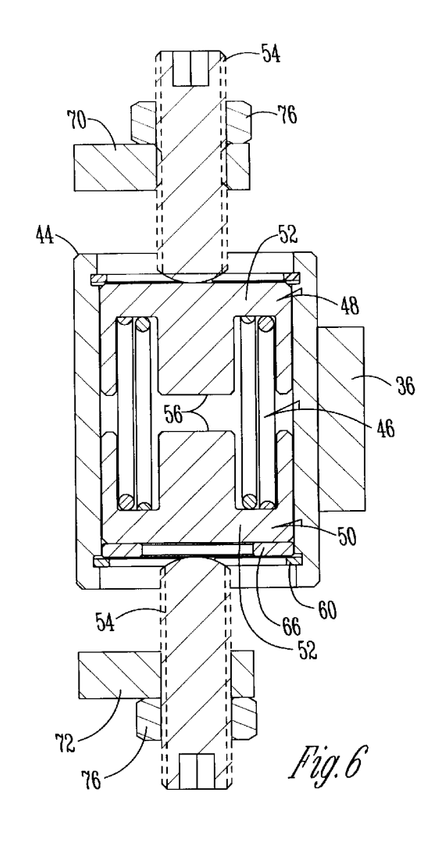
FIG. 6 is a sectional view taken along line 6—6 in FIG. 2.
Figure 7:
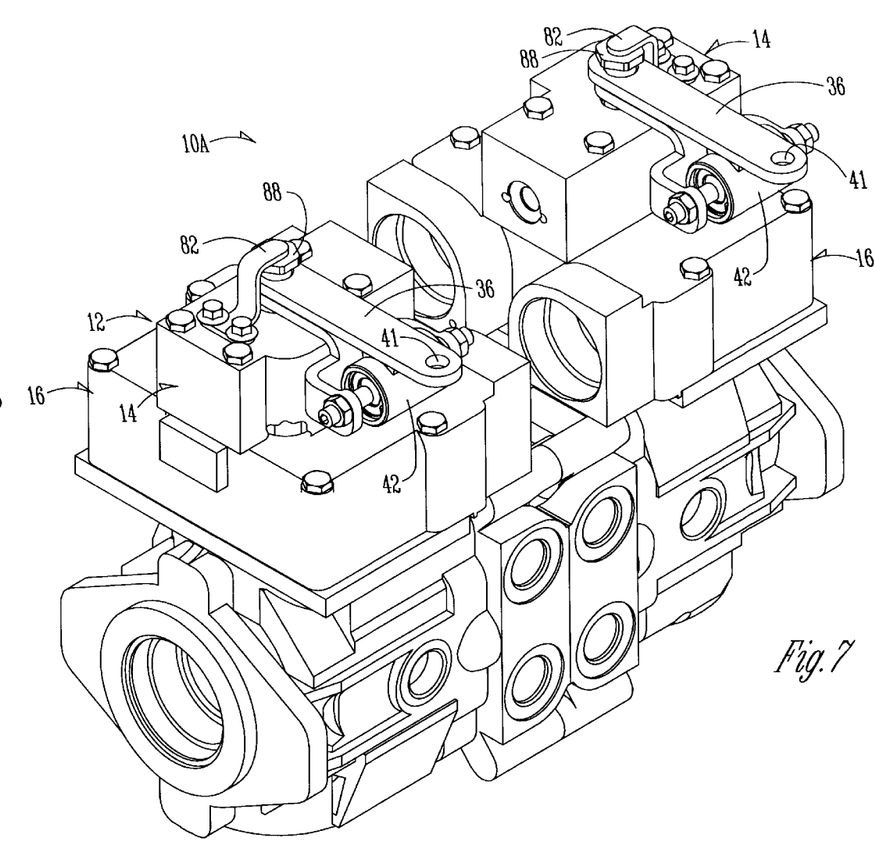
FIG. 7 is a perspective view of a tandem pump equipped with the present invention on both the front and rear pump.

A spring mechanism 42 attaches rigidly to the actuator 36. The spring mechanism 42 preferably hangs from the bottom surface 40 as shown in FIGS. 5 and 6. The spring mechanism 42 includes an elongated tubular housing 44 into which a coil compression spring 46 extends axially. Of course, other types of springs could be used without detracting from the invention.

A pair of axially spaced spring seats 48, 50 engage the ends of the spring 46. The spring seats 48, 50 have a generally cup-shaped body portion 52 for guidingly receiving the spring 46. A threaded stem 54 extends axially from the body portion 52. A central post 56 in each of the seats 48, 50 also assists in guiding the spring 46. A pair of snap rings 58, 60 fit into grooves 62, 64 in the housing 44 to retain the spring 46. A washer 66 or shim can be interposed between the spring 46 and the snap rings 58, 60 to preload the spring assembly to the desired value. The height of the body portion 52 and the central post 56 relative to the fully compressed height of the spring 46 are also design concerns. Shims may also be inserted in the cup-shaped body 52 to further control the characteristics of the spring 46. It is generally undesirable to repeatedly fully compress the spring 46. The spring 46 can be selected to yield the desired feel/"stroke assist" characteristics. A single spring can be used or multiple springs can be nested as shown in FIG. 6. Thus, the spring mechanism 42 provides various opportunities for fine tuning the invention for different hydrostatic-load/stroke-assist relationships, thereby making it adaptable to various types of machinery and applications.

A generally Y-shaped spring driven lever or yoke 68 attaches to the threaded stems 54 at either end of the spring mechanism. The lever 68 has a pair of spaced apart arms 70, 72 which are joined together at a main handle 74 that is rotatably connected to the control spool 26 and drivingly connected to the control sleeve 22 so as to rotate the sleeve 22 with respect to the control housing 24. Locknuts 76 install onto the stems 54 to lock the stems to the arms 70, 72. Adequate spacing must be provided between the arms 70, 72 of the lever 68 to allow for compression of the spring 46 and to establish the desired control parameters and characteristics.

Referring to FIGS. 1–5, the spool 26 and the sleeve 22 fit slidably and rotatably in a bore 78 in the control housing 24. A pin 80 limits the axial movement of the sleeve 22 and spool 26 in one direction while a holddown member 82 secured to the control housing 24 stops axial movement in the other direction. The spool 26 has first and second shoulders 84A, 84B thereon. The main handle 74 of the spring driven lever 68 rotatably mounts over a threaded end 86 of the spool 26 and engages the first shoulder 84A. The actuator 36 then mounts onto the threaded end 86 adjacent the lever 68 and engages the lever 36 and the second shoulder 84B. A cap nut 88 attaches to the threaded end 86 of the spool 26 and thereby secures the levers 68, 36 to rotate with the sleeve 22 and the control spool 26, respectively. The holddown member 82 engages the top of the cap nut 88. The spool 26 can rotate inside the sleeve 22.

A blind construction hole 90 fluidly connects the ports 28, 30 in the sleeve 22 and the grooves 32 in the spool 26 with a pair of control passages 96, 98. A threaded plug 94 seals the hole 90 from the outside. The fluid passages 96, 98 communicate with the servo piston(s) 18 through passages 100, 102. A pressure inlet port 104 extends into communication with the ports 28, 30 of the sleeve 22 and thus the grooves 32 of the spool 26 in the control housing 24.

The sleeve 22 is coupled to the handle 106 of the swashplate 20 by two coupling members 108, 110. The pin 80 secures the first coupling member 108 to the sleeve 22. A roll pin 107 secures the first coupling member 108 to the second coupling member 110. The swashplate 20 attaches to the second coupling with a conventional pin 114 and annular groove 116 arrangement. Thus, the swashplate 20 can be rotated about the axis 112 of the handle 106, which also coincides with the central axis of the sleeve 22 and the spool 26. The sleeve 22 mechanically couples to the swashplate 20 in an essentially direct manner. The swashplate 20 can be rotated mechanically by the sleeve 22 until the preload of the spring mechanism is overcome. Thereafter, oil is ported to the servos and the movement of the swashplate is servo assisted.

In operation, the control device 12 has a zero displacement or neutral position in which the hydraulic unit has no output and the swashplate 20 is in the position shown in FIG. 4. The control sleeve 22 and spool 26 align angularly so that the ports 28, 30 are blocked and the hydraulic unit 10 displaces essentially no flow. The levers 36, 68 are preferably also aligned so that the spring mechanism 42 is centered within its possible travel.

Referring to FIGS. 3 and 5, when the operator moves the lever 36 attached to the spool 26 in a horizontal direction by electrical or mechanical means, the lever 68 attached to the sleeve 22 moves synchronously or in unison., This means that the sleeve 22 and the spool 26 rotate in unison near the neutral position. No relative angular movement occurs between them. The ports 28, 30 remain blocked. However, the swashplate rotates because it is coupled to the rotating sleeve 22.

When the force on the actuator lever 36 exceeds the preload of the spring mechanism 42, the posts 56, the seats 50, 52, or the spring 46 itself will stop the compression of the spring mechanism 42. Then the sleeve 22 will no longer rotate with the spool 26. The spool 26 will be angularly displaced relative to the sleeve 22. Consequently, the ports 28, 30 will open and port a control signal to the servo 16 to hydraulically assist in stroking the unit 10.

As the servo piston(s) 18 move in response to the control signal, the swashplate 20 is rotated. The control sleeve 22 rotates with the swashplate 20, thereby restricting the fluid passages 28, 30, 32 that are directing pressurized fluid to the servo piston(s) 18. The angular relationship between the control spool 26 and the control sleeve 22 continuously regulates or modulates the flow of pressurized fluid to the servo piston(s) 18 in order to maintain the relative position between the control spool 26 (which is connected to the actuator 36) and the swashplate 20, thereby governing both the volume and the direction of the hydrostatic flow from the unit 10.

One element of this control mechanism is a modified servo control. The control is modified such that the servo function does not operate until the forces exerted to move the swashplate 20 exceed a pre-set level. Until the pre-set force level is attained, the control 12 functions as a direct manual displacement stroking mechanism.

This invention provides a bias coupling link between the control spool and the control sleeve by means of a spring mechanism 42. This coupling causes the control sleeve 22 to rotate synchronously with the spool 26 under low load conditions. Because the swashplate 20 is connected to the sleeve 22, this simultaneous rotation of the control spool 26 and sleeve 22 results in movement of the swashplate 20, thus stroking the hydrostatic unit 10. The spring mechanism 42 has a preloaded spring 46 incorporated into it such that it will only "drive" the control sleeve 22 in this synchronous relationship until the torque reaction of the swashplate 20 exceeds the spring pre-load. As the load to rotate the swashplate 20 exceeds the spring force driving it, the control spool 26 and sleeve 22 begin to experience relative angular rotation or displacement. This angular displacement causes control pressure to activate the servo pistons 18 as described above. The resulting pressurization of the servo piston 18 provides additional force to stroke the swashplate 20, thereby "assisting" the operator's manual effort. The servo assist is only provided when the load on the swashplate 20 exceeds the preload on the spring mechanism 42. Changing the preload of the spring mechanism 42 provides an excellent method of "fine tuning" this invention for different hydrostatic-load/stroke-assist relationships, thereby making it adaptable to various types of machinery and applications.

Figure 8:
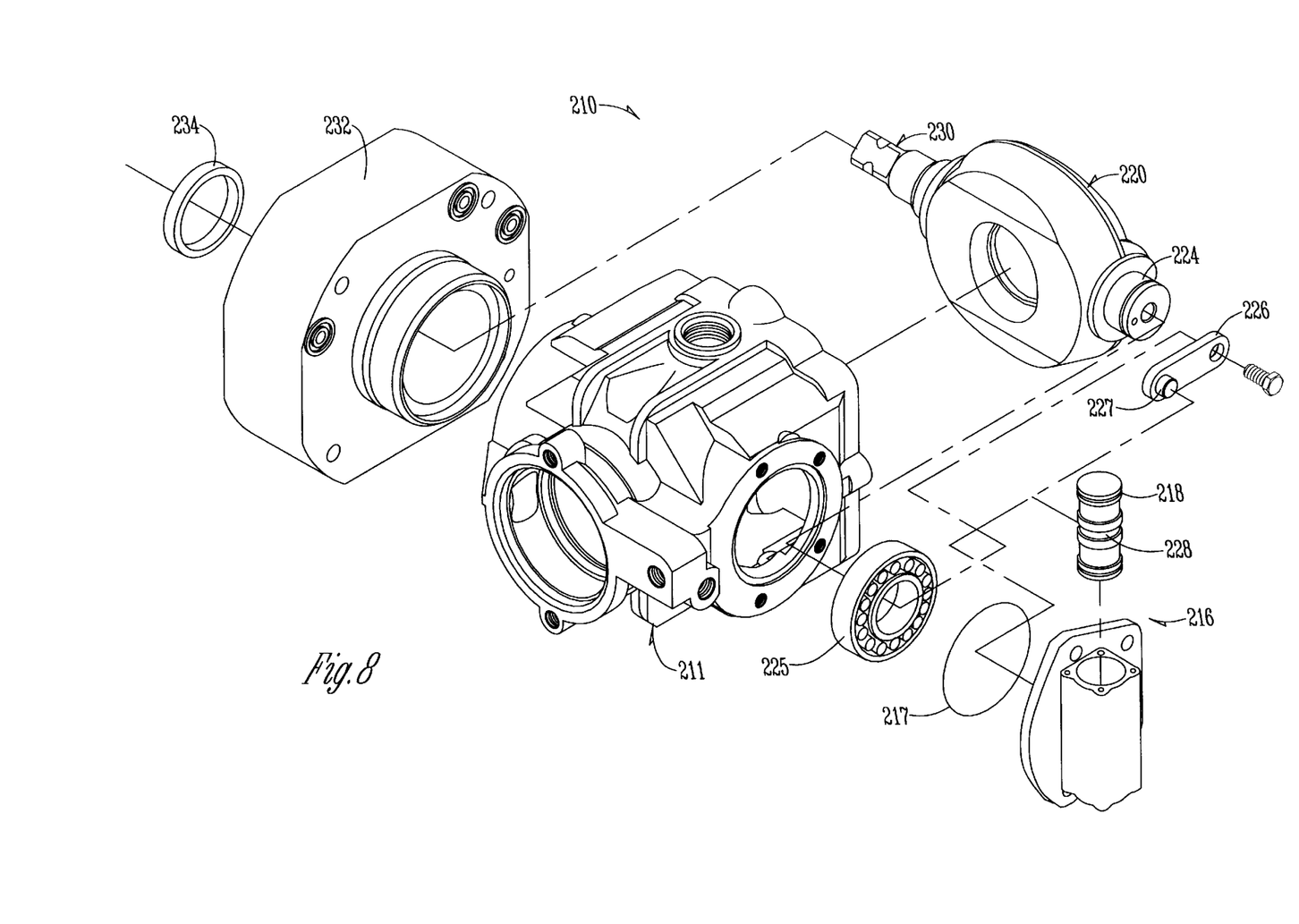
FIG. 8 is a perspective exploded assembly view of an alternative embodiment of the displacement control of this invention.

An alternative embodiment of the present invention is shown in FIGS. 8–14. Referring to FIG. 8, a hydraulic unit 210 has a housing 211 and a displacement control 212 which includes a flow control valve assembly 214 (FIG. 9) and a servo assembly 216. The servo assembly 216 includes one or more pistons 218 coupled by direct mechanical linkage to a swashplate 220. As in the previously described embodiment, movement of the servo piston 218 causes rotation or assists in the stroking of the swashplate 220, which results in a change in the displacement of the hydraulic unit 210.

Figure 10:
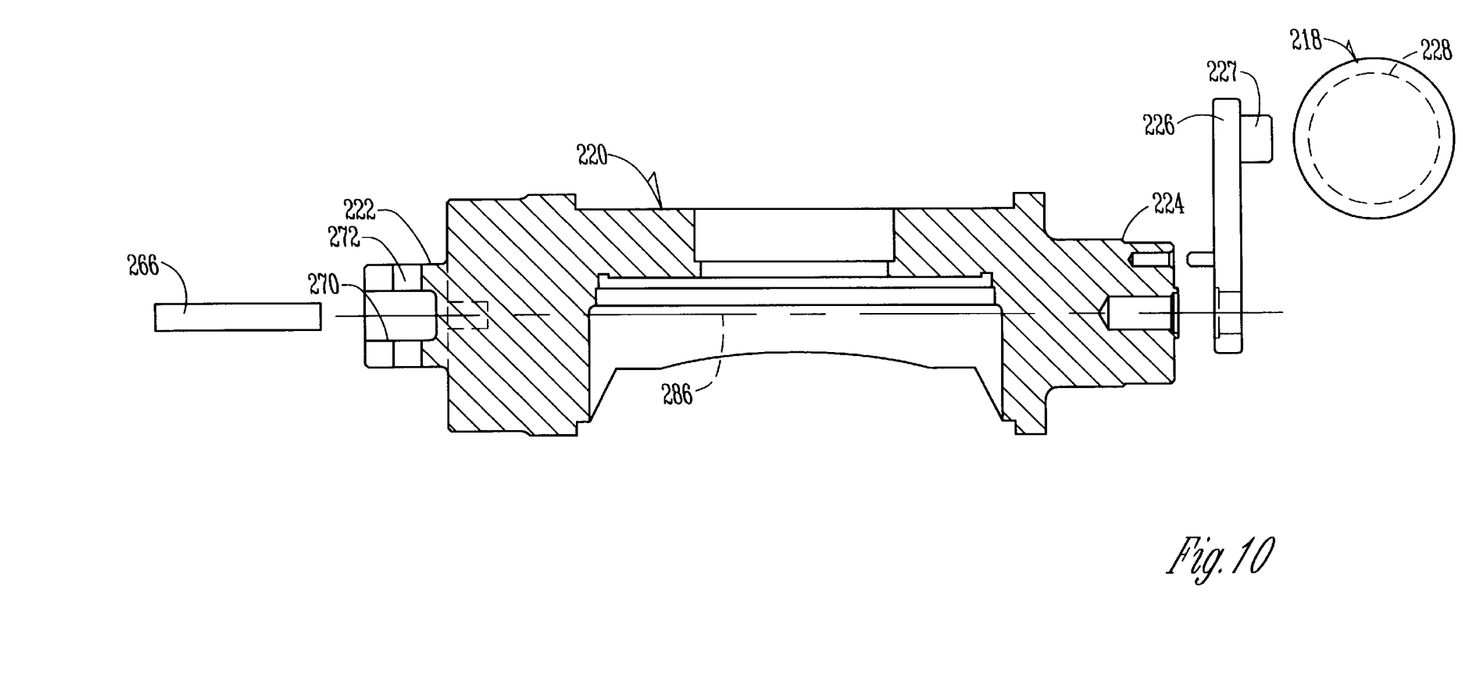
FIG. 10 is a cross sectional view of the movable member or swashplate taken along line 10—10 in FIG. 9. For clarity, the drive pin, link and servo piston associated with the movable member are not shown in cross section.
Figure 11:
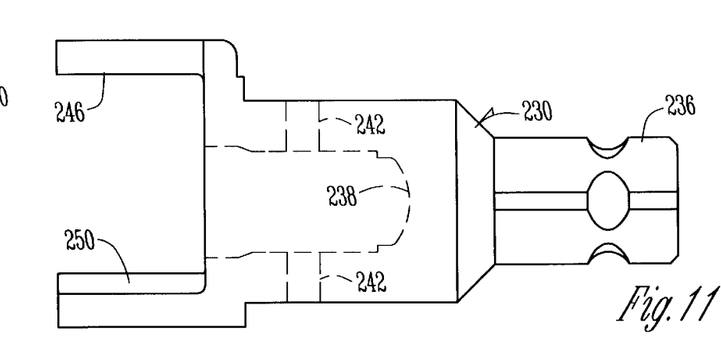
FIG. 11 is front elevation view of the control sleeve of FIG. 9.
Figure 12:
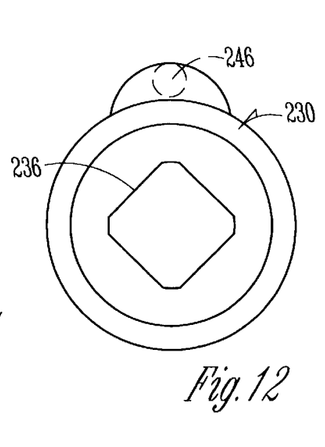
FIG. 12 is a right side elevation view of the control sleeve of FIG. 11.
Figure 13:
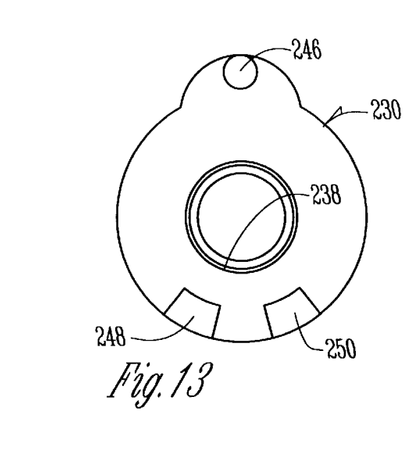
FIG. 13 is a left side elevation view of the control sleeve of FIG. 11.

The flow control valve assembly 214 is associated with the main input trunnion 222 of the movable member or swashplate 220. The servo assembly 216 is associated with the opposite end 224 of the swashplate 220. As best seen in FIG. 10, the servo piston 218 is mechanically coupled to the swashplate 220 by a link 226. A portion 227 of the link 226 protrudes into an annular notch 228 in the servo piston 218.

FIGS. 9 and 11–13 show the flow control valve assembly 214 in greater detail. The control sleeve 230 is rotatably mounted to the hydraulic unit 210 through a trunnion cover 232 which has a seal 234 for preventing leakage from the unit 210. The control sleeve 230 has a generally rectangular, preferably square trunnion control shaft or actuator 236 protruding away from the unit 210. The actuator 236 is adapted to have a conventional lever arm (not shown) attached for operator input. The other end of the control sleeve 230 has a cavity 238 therein, which is adapted to receive a control spool 240. At least one fluid passageway 242 extends through the sleeve 230 and intersects the bore 238. Similar to the previously described embodiment, the spool 240 has grooves or holes 244 therein which can be aligned with the fluid passageways 242 of the control sleeve 230 so as to provide a flow of fluid to the servo 216. The end of the control sleeve 230 opposite the actuator 236 has a round drive lug 246 extending therefrom and a pair of angularly spaced override lugs 248, 250 generally opposite the drive lug 246. Together the drive lug 246 and the override lugs 248, 250 form a cavity 252 larger than the bore 238 and offset therefrom.

The spool 240 includes an upper end 254 having a hollow 256 formed therein. A cross hole 258 intersects the hollow 256 and extends transversely through the upper end 254 of the spool 240. A fluid passage 260 extends through the trunnion cover 232 to supply pressurized control fluid to the sleeve 230 and the spool 240.

Figure 9:
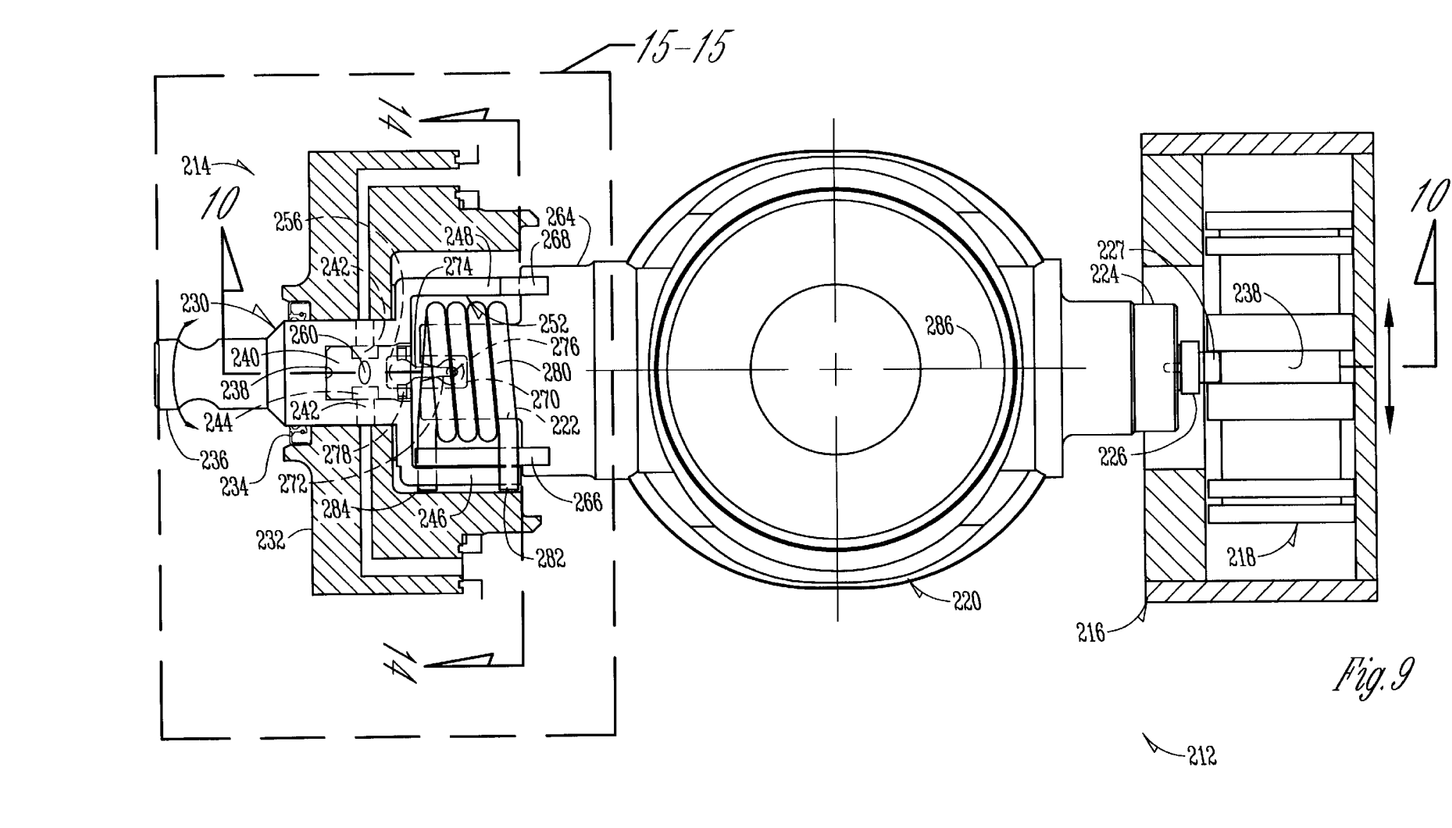
FIG. 9 is a plan view of the control elements assembled on the movable member shown in FIG. 8. The trunnion cover has been sectioned to expose the fluid passageways.

Referring to FIGS. 9 and 10, the movable member or swashplate 220 has a main input trunnion shaft 222. The swashplate 220 includes an enlarged bearing diameter 264 adjacent to the trunnion shaft 222. A pair of pins 266, 268 extends from the outer face of the bearing diameter 264. The pins 266, 268 preferably are approximately 180 degrees apart and extend generally parallel to the trunnion shaft 222.

A cavity 270 is formed in the end of the trunnion shaft 222. The cavity 270 generally mates with the hollow 256 in the control spool 240. A slot 272 is formed through the trunnion shaft as shown in FIGS. 9 and 10.

Figure 15:
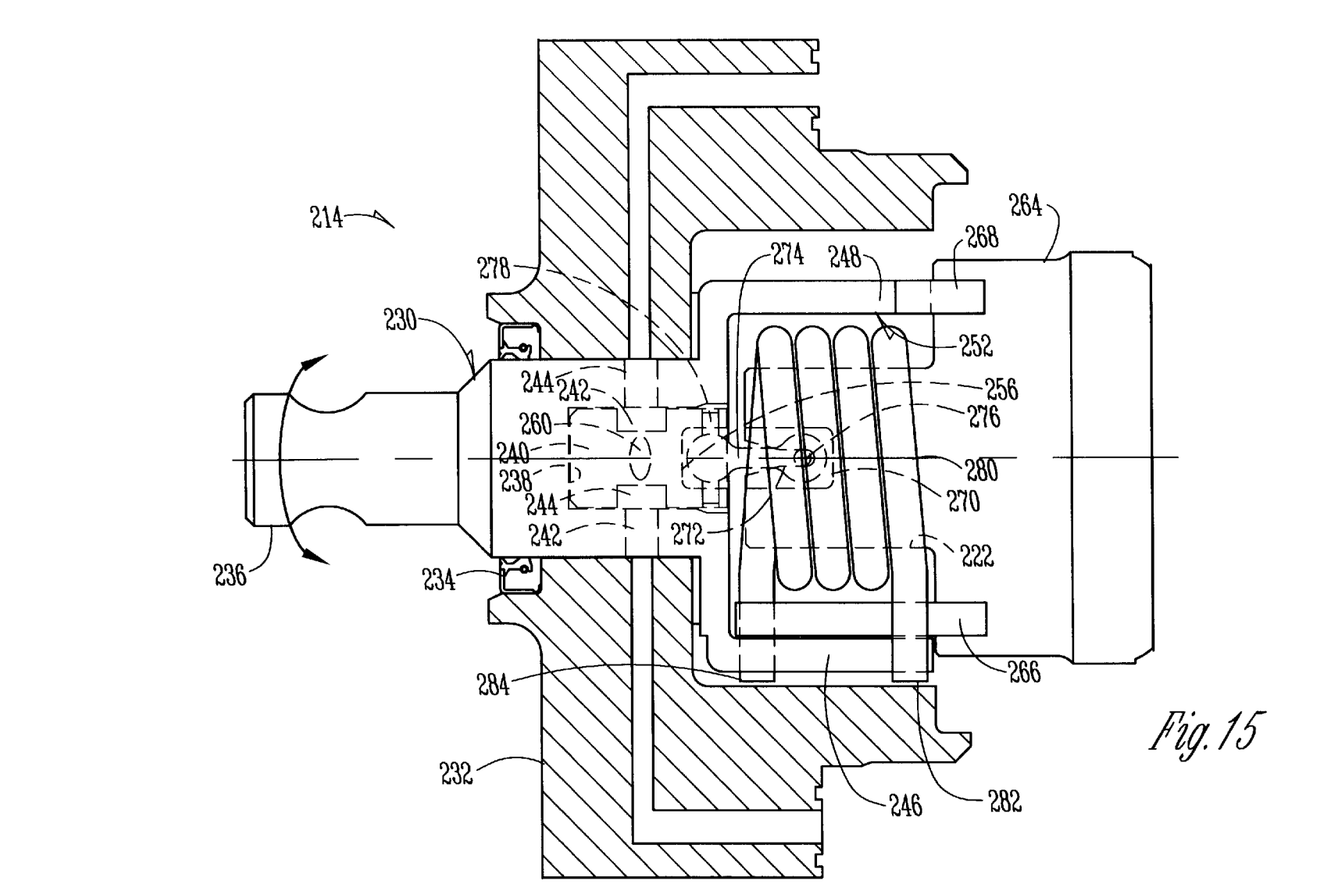
FIG. 15 is an enlarged view of the area denoted 15—15 in FIG. 9.

Referring to FIG. 15, a barbell shaped drive/feedback link 274 and two pins 276, 278 couple the control spool 240 with the trunnion shaft 222 of the swashplate or movable member 220. The link 274 is disposed in the cavities 256, 270 of the spool 240 and the trunnion shaft 222. The middle portion of the link 274 fits through the slot 272. The pins 276, 278 are inserted approximately perpendicular to each other. The control spool 240 is coupled to the movable member or swashplate 220 and moves in response to movement of the swashplate.

Figure 14:
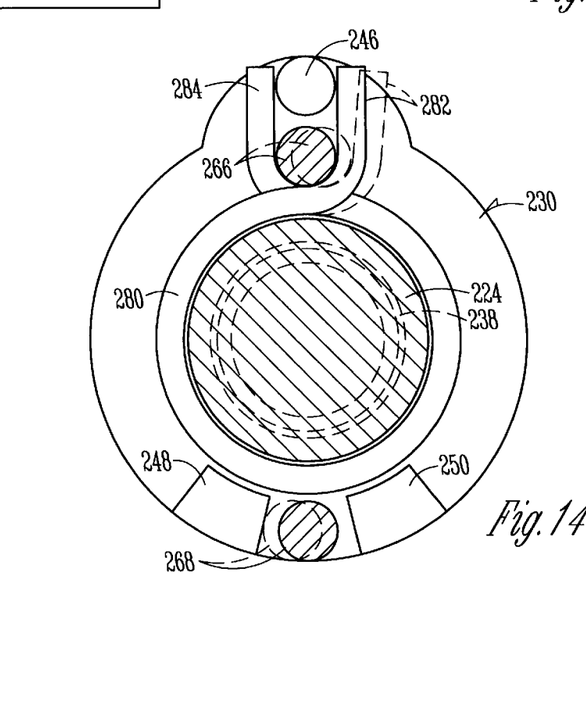
FIG. 14 is a cross sectional view taken along line 14—14 in FIG. 9 and shows the relative positions of the torsional spring, the control sleeve, and the swashplate. Solid lines indicate the condition where the input torque is less than the preload of the spring, while dashed lines indicate the condition where feedback torque is greater than the spring preload.

A torsional spring 280 is operatively interposed between the control sleeve 230 and the swashplate 220. The torsional spring 280 has an inner diameter adapted to receive the swashplate trunnion shaft 222. As best seen in FIGS. 9 and 14, the torsional spring 280 includes ends 282, 284. In an unloaded state, the ends 282, 284 of the torsional spring 280 are closer to each other than shown in FIG. 14. However, the drive lug 246 on the control sleeve 230 and/or the drive pin 266 on the swashplate are inserted between the spring ends 282, 284 to spread them and thereby preload the spring. The override pin 268 on the swashplate 220 extends between the override lugs 248, 250 of the control sleeve 230 when the trunnion shaft 222 is inserted in the cavity 252 of the sleeve 230.

Several features of this torsional spring embodiment are worthy of further discussion. First, the sleeve 230 is coupled to or integrally formed with the actuator 236. Thus, the sleeve 230 moves in response to movement of the actuator 236. The swashplate 220 serves as the movable member and also comprises part of the feedback mechanism. The swashplate or movable member 220 has a tilt axis or axis of rotation 286 which extends through the center of the trunnions and the bearing diameter 264. The tilt axis or axis of rotation 286 is perpendicular to the movement of the servo piston 218, as best seen in FIG. 9. In other words, the servo piston 218 mounts transverse to the tilt axis 286.

In operation, the displacement control device 212 (which includes 214, 216 as shown in FIG. 9) of this embodiment allows the operator to "feel" and stroke the hydraulic unit 210 at low load levels, yet provides hydraulic stroking assistance at higher load levels. As with the first embodiment, hydraulic stroking assistance occurs when the load feedback on the swashplate 220 exceeds the preload on the spring 280. For example, the operator first begins to stroke the unit in either a forward or reverse direction by torquing the actuator 236 in the corresponding direction. The attached control sleeve 230 rotates, which carries the swashplate 220 and the spool 240 because of the link 274 and the preload of the spring 280. No relative movement takes place between the control sleeve 230 and the spool 240. Therefore, no fluid is ported through the fluid passageways 242, 244 to the servo piston 218. Under these conditions, the operator can feel the load feedback and position on the swashplate 220 as resistance on the actuator 236.

When the load feedback on the swashplate 220 due to the operation of the hydraulic unit 210 exceeds the preload on the spring 280, the torsional spring 280 begins to allow relative rotational movement between the control sleeve 230 and the swashplate 220. As indicated by the dashed lines in FIG. 14, the drive lug 246 on the control sleeve 230 pushes the spring end 284 away from the other spring end 282 which is restrained by the drive pin 266. Because the control spool 240 is connected by link 274 to the swashplate 220, the control sleeve 230 also rotates with respect to the control spool 240. As a result, fluid will be ported to one of the fluid passageways 242, 244. This control fluid is routed in a conventional manner to the servo 216 and applied to one of the ends of the servo piston 218.

The servo piston 218 is drivingly linked to the movable member or swashplate 220. Therefore, when additional fluid is applied to one end of the servo piston 218, the servo piston 218 will apply additional torque to the swashplate 220 to rotate it in the desired direction. In other words, the operator will be hydraulically assisted in stroking the unit 210.

Once sufficient control fluid has been provided to the servo piston 218, the control 212 modulates the control signal to maintain the desired stroke assistance. The same thing happens when the operator strokes the unit 210 in the opposite direction, except the relative movement with the control 212 is in the opposite direction.

When the operator destrokes the hydraulic unit 210, the process is reversed. The operator forcibly rotates the actuator 236 toward the neutral position. This rotates the control sleeve 230 back toward the position shown by solid lines in FIG. 14. The sleeve 230 moves relative to the swashplate 220 and the spool 240, reducing the control signal until the passageways 242, 244 are completely blocked. Then the operator will have direct control or "feel" so long as the spring preload exceeds the feedback force.

An optional feature of this embodiment of the present invention is the override mechanism which prevents the spring 280 from being overloaded or overstressed. A pair of angularly spaced apart override lugs 248, 250 extend from the inward end of the control sleeve 230. The override pin 268 which extends from the swashplate 220 is positioned generally opposite the drive pin 266 and between the override lugs 248, 250. By abutment with the lugs 248, 250, the override pin 268 limits the relative angular displacement of the spring ends 282, 284 and thereby the relative angular displacement of the control sleeve 230, the swashplate 220 and the control spool 240. The dashed lines in FIG. 14 illustrate the restrained position of the torsional spring 280. Rotation in the opposite direction is similarly limited. Of course, the lugs 248, 250 could be positioned to provide for different angular displacement limits in the forward and reverse modes. The override feature can also be utilized to limit the control flow into the fluid passageways 242, 244.

The present invention allows for various modifications and variations. For instance, this invention can be applied to a linear control which has a control spool and sleeve that slide longitudinally relative to each other. The bias coupling element of this invention advantageously interconnects a movable member, a feedback element, an actuator, the spool sleeve of a control valve, and a servo.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A displacement control device for a variable displacement hydraulic unit having a movable member disposed therein for varying the fluid displacement of the unit comprising:

an actuator for applying an operator input force to the movable member;

a control valve having a spool and a sleeve displaceable with respect to each other, one of the spool and the sleeve being mechanically coupled with the movable member, the other of the spool and the sleeve being mechanically coupled with the actuator, the control valve being capable of generating a control signal based upon the relative displacement of the spool and the sleeve;

a servo for receiving the control signal from the control valve and being operatively connected to the movable member so as to forcibly move the movable member and thereby vary the fluid displacement of the hydraulic unit in response to the control signal;

the control valve and the servo being structurally separate and distinct elements;

a yieldable bias coupling comprising a spring operatively interposed between the spool and the sleeve of the control valve whereby a preload force is interposed between the spool and the sleeve;

the spring being remote from the servo and free from engagement therewith;

the spring being continuously operatively connected to the actuator and to at least one of the spool and the sleeve and being of sufficient load bearing capacity to provide load force and position feedback of the movable member as well as direct control of movement of the movable member anywhere between a position of no fluid displacement and a position of maximum fluid displacement;

whereby the sleeve moves synchronously with the spool until a load force on the movable member exceeds the preload force of the bias coupling whereupon relative displacement of the spool and the sleeve occurs so as to generate the control signal to the servo and cause the servo to supplement the operator input force in moving the movable member to vary the fluid displacement of the unit and wherein the preload force is sufficient to provide direct control of movement of the movable member throughout a range of positions between a position of no fluid displacement and maximum fluid displacement.

2. The device of claim 1 wherein the sleeve is coupled to the movable member and the movable member moves in response to movement of the sleeve.

3. The device of claim 1 wherein the spring comprises a coil compression spring.

4. The device of claim 1 wherein the spring comprises a torsional spring.

5. The device of claim 4 wherein the torsional spring has an inner diameter and the movable member comprises a swashplate having a trunnion shaft protruding into the inner diameter of the torsional spring.

6. The device of claim 4 wherein the torsional spring extends into the sleeve and has protruding opposing ends, and wherein a drive pin attached to the movable member engages one of the ends and a drive lug attached to the sleeve engages the other of the ends such that the movement of the ends toward each other is limited.

7. The device of claim 6 wherein the opposing ends are separated by a predetermined angular distance in an unloaded state of the spring and wherein one of the drive pin and drive lug engages at least one of the ends so as to hold said end at a distance different than the predetermined angular distance whereby a desired preload is placed on the spring.

8. The device of claim 7 comprising stop members on the sleeve and the movable member respectively for limiting relative rotation of the sleeve and the movable member.

9. The device of claim 8 wherein a pair of angularly spaced stop members are provided on the sleeve and a stop member on the movable member protrudes between the angularly spaced stops so as to limit relative rotation of the sleeve and movable member in two directions.

10. The device of claim 1 wherein the bias coupling comprises a yoke having an elongated neck drivingly connected to the one of the sleeve and the spool and a pair of spaced arms extending outwardly from the neck, a spring housing attached to the actuator and mounted between the arms, and a spring mounted on the spring housing between the arms; the actuator being drivingly connected to the other of the spool and the sleeve; the spring being operatively interposed between the actuator, the sleeve, the arms, and the spool so as to provide said preload force.

11. The device of claim 10 wherein the spring housing is tubular and the spring is mounted therein.

12. The device of claim 10 wherein the spring is a coil compression spring having opposite ends and the bias coupling further comprises a pair of opposing spring seats engaged and yieldingly urged outwardly by the spring with a predetermined preload force.

13. The device of claim 12 wherein each of the spring seats includes a stud protruding therefrom for attaching the spring seat to one of the arms.

14. The device of claim 13 wherein the stud is threaded and includes a nut thereon for adjustably mounting the spring housing and spring between the arms.

15. The device of claim 1 wherein the movable member is a swashplate.

16. The device of claim 1 wherein the movable member is an elongated swashplate having a longitudinal axis and being tiltable with respect to the longitudinal axis, the servo comprising at least one servo piston mounted transverse to the longitudinal axis.

17. The device of claim 1 wherein the control valve is a rotary control valve such that the sleeve and the spool rotate relative to each other.

18. The device of claim 1 wherein the spool is coupled to the actuator and moves in response to movement of the actuator.

19. The device of claim 1 wherein the control valve generates a fluid control signal based upon the relative angular displacement between the spool and the sleeve.

20. The device of claim 1 wherein the spring comprises a torsional spring operatively interposed between the sleeve and the movable member.

21. The device of claim 1 wherein the movable member is coupled to the spool by a drive link.

22. The device of claim 21 wherein the drive link has two angularly spaced pins extending therefrom, one of the pins engaging the movable member and the other of the pins engaging the spool.

23. The device of claim 1 wherein the sleeve is coupled to the actuator and moves therewith.

24. The device of claim 1 wherein the spool is coupled to the movable member and moves in response to movement of the movable member.

25. The device of claim 1 wherein the sleeve has a bore therein for receiving at least a portion of the spool.

26. The device of claim 1 wherein the sleeve is elongated and has a plurality of spaced apart protrusions extending axially therefrom so as to define a cavity between the protrusions, the spring comprising a torsional spring disposed in the cavity.

27. The device of claim 1 wherein the sleeve has a trunnion shaft attached thereto that comprises the actuator.

28. The device of claim 1 comprising a trunnion cover having a bore therein for receiving the sleeve and having a pair of fluid passageways intersecting the bore for routing the control signal from the control valve to the servo.

29. The device of claim 1 wherein the sleeve has a sidewall with openings therein and the spool is positioned concentrically in the sleeve and has notches thereon such that relative movement of the sleeve and the spool permits the control signal to pass through at least some of the notches and at least some of the openings.

30. The device of claim 1 wherein the movable member , the spool, and the sleeve each have a longitudinal axis extending therethrough and the longitudinal axis of the movable member coincides with the longitudinal axis of the spool and the longitudinal axis of the sleeve.

* * * * *